United States Patent [19]

Toya et al.

[11] Patent Number: 4,698,397
[45] Date of Patent: Oct. 6, 1987

[54] CHOLESTERIC LIQUID CRYSTAL COPOLYESTERS

[75] Inventors: Tomohiro Toya, Yokohama; Hajime Hara, Fujisawa; Shigeki Iida; Tetsuo Satoh, both of Yokohama, all of Japan

[73] Assignee: Nippon Oil Company, Ltd., Tokyo, Japan

[21] Appl. No.: 901,660

[22] Filed: Aug. 28, 1986

[30] Foreign Application Priority Data

Sep. 4, 1985 [JP] Japan ................................ 60-193823

[51] Int. Cl.$^4$ ............................................. C08G 63/76
[52] U.S. Cl. .................................... 525/437; 528/176; 528/194
[58] Field of Search ............... 525/437, 444; 528/176, 528/194

[56] References Cited

U.S. PATENT DOCUMENTS

| | | | |
|---|---|---|---|
| 4,146,702 | 3/1979 | Morris et al. | 528/191 |
| 4,242,496 | 12/1980 | Jackson et al. | 528/190 |
| 4,621,129 | 4/1986 | Yoshimura et al. | 528/176 |
| 4,652,626 | 3/1987 | Orii et al. | 528/194 |

*Primary Examiner*—Lucille M. Phynes
*Attorney, Agent, or Firm*—Scully, Scott, Murphy & Presser

[57] ABSTRACT

A process for preparing a cholesteric liquid crystal copolyester consisting essentially of structural units represented by the following formula (A), (B), (C) and (D):

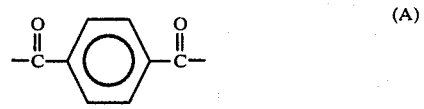

(A)

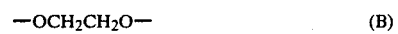

(B)

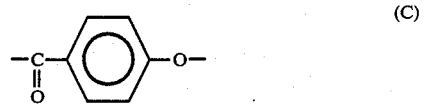

(C)

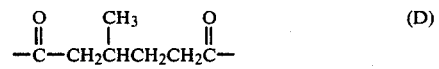

(D)

which is optically active characterized in that a polyethylene terephthalate oligomer having a (B)/(A) mole ratio in the range of 1.1 to 1.8, p-acetoxybenzoic acid and 3-methyladipic acid are reacted to prepare the final cholesteric liquid crystal copolyester having an inherent viscosity of at least 0.4 dl/g.

5 Claims, No Drawings

CHOLESTERIC LIQUID CRYSTAL COPOLYESTERS

BACKGROUND OF THE INVENTION

The present invention relates to novel aromatic copolyesters capable of being subjected to melt-processing having high strength and high modulus and less anisotropy of mechanical properties.

Recently there has been increasing demand for materials which when formed into fibers, films and shaped articles exhibit high modulus and resistance to heat and to chemicals. Although polyesters are in use for various shaped articles, many of them are inferior in mechanical properties such as flexural modulus and have therefore been unsuitable heretofore for uses requiring high strength and high modulus. As a method for improving such mechanical properties there has been known incorporating fillers or reinforcing materials such as calcium carbonate or glass fibers into polyesters. However, this method causes problems in practical use; for example, the light weight characteristic, which is a feature of plastics, is lost because of increase in specific gravity of the resulting blend, and when the blend is processed, the processing machine is subjected to heavy wear.

Liquid crystal polyesters have come to be noted recently as polyesters suitable for uses requiring high strength and high modulus even without using reinforcing materials or the like. Special attention has been paid to such polyesters since W. J. Jackson made public thermoplastic liquid crystal polyesters comprising polyethylene terephthalate and p-hydroxybenzoic acid in U.S. Pat. No.3,804,805 and Journal of Polymer Science Polymer Chemistry Edition, Vol.14, page 2043 (1976). Since then, various liquid crystal polyesters have been developed and studied with a view to attaining both improvement of strength and modulus, and melt-processability. However, none of them have been put to practical use yet as shaped articles or films. This is because these liquid crystal polymers exhibit a high orientatability in molten condition resulting in creation of a great anisotropy in their mechanical properties.

As means for eliminating such anisotropy and attaining a high modulus and high strength biaxial oriented film, the use of a cholesteric liquid crystal polymer has been proposed by W. R. Krigbaum et al (see U.S. Pat. No.4,412,059). According to this proposed method, however, the transesterification is slow and it is impossible to introduce a desired amount of optical active units. Further, in some particular linkage of flexible structural units there may arise problems such as deterioration of physical properties or spoiling the formation of the liquid crystal.

SUMMARY OF THE INVENTION

It is the object of the present invention to provide a process for preparing a cholesteric liquid crystal copolyester, free of such difficulties involved in the prior art, capable of introducing in the polymer chain 3-methyladipic acid in an amount sufficient to develop the cholesteric liquid crystallinity, and not deteriorating physical properties of the polymer.

The present invention resides in a process for preparing a cholesteric liquid crystal copolyester consisting essentially of structural units represented by the following formulae (A), (B), (C) and (D):

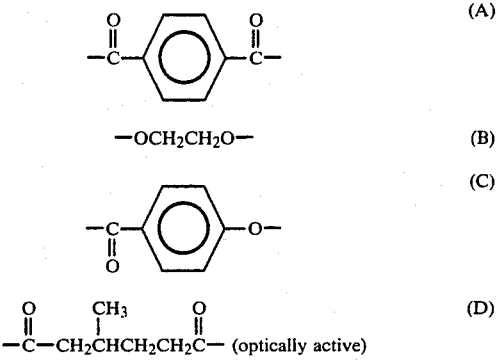

characterized in that a polyethylene terephthalate oligomer having a (B)/(A) mole ratio in the range of 1.1 to 1.8, p-acetoxybenzoic acid and 3-methyladipic acid are reacted to prepare the final cholesteric liquid crystal copolyester having an inherent viscosity of at least 0.4 dl/g.

In the present invention, p-acetoxybenzoic acid and (+)-3-methyladipic acid are simultaneously reacted with the polyethylene terephthalate oligomer, whereby the expensive (+)-3-methyladipic acid can be introduced in the polymer chain effectively and it is possible to efficiently produce a cholesteric liquid crystal copolyester capable of being subjected to melt-processing, having high strength and high modulus, and less anisotropy of mechanical properties.

If the polyethylene terephthalate oligomer and (+)-3-methyladipic acid are reacted in the absence of p-acetoxybenzoic acid, the loss of the expensive (+)-3-methyladipic acid during polymerization will be large and there will be an increase of 3-methyladipic acid-ethylene glycol linkage which is considered disadvantageous to the formation of liquid crystal.

On the other hand, in the case of using the alkyl ester of p-hydroxybenzoic acid in place of p-acetoxybenzoic acid, there arise drawbacks; for example, the monomer volatilizes easily, and due to a slow transesterification, it is difficult to introduce (+)-3-methyladipic acid units, or the liquid crystal forming ability is impaired due to the formation of ester linkage between hydroxybenzoic acid and ethylene glycol.

DETAILED DESCRIPTION OF THE INVENTION

The cholesteric liquid crystal copolyester of the present invention consists essentially of the four structural units (A), (B), (C) and (D).

The structural units (A) and (B) are fed from a polyethylene terephthalate oligomer, the (B)/(A) mole ratio being in the range of 1.1 to 1.8, preferably 1.2 to 1.5.

The structural unit (C) is fed from p-acetoxybenzoic acid. Its proportion is 20 to 80 mole %, preferably 30 to 70 mole %, of the constituent units of the copolyester of the present invention.

The structural unit (D) is fed from 3-methyladipic acid and it is characterized by being optically active. Its proportion is 1 to 20 mole %, preferably 2 to 15 mole %, of the constituent units of the copolyester of the present invention.

It is assumed that the total of the structural units (A), (B), (C) and (D) is 100 mole %.

The structural unit (D) is essential for developing cholesteric mesophase. There may be used either R or S isomer resolved from a RS racemic mixture. Even in the case of a RS mixture, if either one is present in a larger proportion, an optical activity is exhibited, and even such a mixture is employable. In this case, however, the helical pitch (P) in cholesteric liquid crystal becomes larger than that in a like liquid crystal using a pure D or L isomer, and thus the cholesteric mesophase forming ability becomes poor. In general, the difference in content between R and S isomers should be not less than 15%, preferably not less than 30%.

A cholesteric liquid crystal polymer has a helical structure twisted at a certain angle in which a nematic liquid crystal layer is induced by an optically active unit. The cholesteric mesophase will be colored if the pitch of the helical structure falls in the range of visible wave length due to selective reflexion.

A cholesteric liquid crystal polymer having a rigid straight chain and an optically active monomer copolymerized in the main chain is expected to afford a film or sheet having a biaxially reinforced structure as if it were a laminated structure.

Thermoplastic polymers such as the cholesteric liquid crystal copolyesters of the present invention are characterized by affording shaped articles which are less anisotropy of physical properties while maintaining high mechanical properties even when they result from processing at high shear rates.

As a thermoplastic cholesteric liquid crystal polymer is heated up slowly under a polarizing microscope equipped with a hot stage, it changes from a crystalline state into a liquid crystal state at a certain temperature and according to circumstances an oily streaks texture peculiar to cholesteric liquid crystal polymers is observed. Further, if such polymer is formed into film followed by quenching, there will remain a cholesteric liquid crystal structure, and if the cholesteric helical pitch length is close to visible wave length, it will be possible to observe a bright cholesteric color which varies depending on the content of chiral component of the structural unit (D).

As the method for preparing the cholesteric liquid crystal copolyester of the present invention, there is adopted a melt polymerization process. More specifically, the polyethylene terephthalate oligomer is prepared in advance, then p-acetoxybenzoic acid which affords the structural unit (C) and 3-methyladipic acid which affords the structural unit (D) are mixed therein and melted, and heating is made to a temperature of 200° to 350° C. usually at atmospheric pressure, allowing polymerization to proceed. For accelerating a polymerization reaction, it is necessary to exclude acetic acid formed by an ester interchange reaction to the exterior of the reaction system. When the acetic acid comes to be no longer distilled out, the polymerization is further continued under a reduced pressure (e.g. not higher than 50 mmHg, preferably not higher than 1 mmHg), and it is terminated when an inherent viscosity ($\eta$inh) as measured using a mixed phenol/tetrachloroethane (60/40 weight ratio) solvent at 30° C. and at a concentration of 0.5 wt. % becomes 0.4 dl/g or higher. For accelerating the polymerization reaction, alkali metals as well as metal salts such as Fe, Mn, Cd, Mg, Ba, Ti, Zn, Pb, Co and Sb salts may be used alone or in combination. These may be added at the stage of preparing the polyethylene terephthalate oligomer. Further, there may be added a phosphorus compound as a decomposition inhibitor. The polyethylene terephthalate oligomer is prepared in a known manner. Usually, terephthalic acid or a derivative thereof (e.g. dimethyl ester) and ethylene glycol are reacted at a mole ratio of 1:1.1~1.8 under known reaction condition for preparing polyesters.

The cholesteric liquid crystal polyester thus obtained can be subjected to melt processing at a temperature not higher than 300° C. and the resulting shaped article is characterized by being less anisotropy of physical properties while having high mechanical characteristics.

The following examples are given to further illustrate the present invention, but it is to be understood that the invention is not limited thereto.

EXAMPLE 1 (1) Preparation of Polyethylene Terephthalate Oligomer 7.5 g of dimethyl terephthalate, 4.8 g of ethylene glycol, 5.5 mg of zinc acetate and 15 mg of antimony acetate were charged into a reactor equipped with a stirrer, and after purging with nitrogen, the temperature of the reactor was raised to 180° C. and reaction was allowed to take place under a nitrogen gas stream for 2 hours. During this period the greater part of methanol was distilled off. Then, the temperature was raised to 270° C. over a period of 10 minutes, and when the temperature reached 270° C., reaction was allowed to proceed for 5 minutes under a reduced pressure of 200 mmHg. Then the temperature was reduced to 120° C. and unreacted ethylene glycol was removed under a reduced pressure of 0.2 mmHg. The (B)/(A) ratio in the resultant polyethylene terephthalate oligomer was 1.35.

(2) Preparation of Cholesteric Liquid Crystal Copolyester 16.2 g of p-acetoxybenzoic acid and 2.1 g of (+)-3-methyladipic acid were charged into the reactor containing the polyethylene terephthalate oligomer prepared in the above (1), and after purging with nitrogen, the temperature of the reactor was raised to 220° C. and reaction was allowed to take place for 1 hour in a nitrogen atmosphere under stirring, followed by further reaction at 230° C. for 1 hour. Then, nitrogen was passed at a rate of 50 cc/min and reaction was allowed to proceed for 1 hour, followed by further reaction for 1 hour under a reduced pressure of 0.2 mmHg. Thereafter, the temperature was raised to 270° C. over a period of 10 minutes and reaction was allowed to proceed under a reduced pressure of 0.2 mmHg for 1 hour and 20 minutes to complete the polymerization. The yield was 75%, and an inherent viscosity ($\eta$inh) as measured using a mixed phenol/tetrachloroethane (60/40 weight ratio) solvent at 30° C. and at a concentration of 0.5 wt. % was 0.50 dl/g. (The following $\eta$inh values were also measured according to this method.)

(3) Film Forming 1 g of the polymer prepared above was placed in a central part of a 18 cm long by 5 cm wide molding plate made of aluminum (which was so made as to permit only a longitudinal flow), then heated to 270° C. and pressed, followed by cooling in an instant with iced water to obtain a film having a thickness of abut 100 $\mu$m. In this film there was recognized an optical selective reflection peculiar to a cholesteric liquid crystal and exhibiting a broad peak at 1,300–1,500 nm.

Test pieces were taken out in both longitudinal and transverse directions from both end portions of this film where fluidity was large during dorming, and were measured for mechanical properties. Results will be tabulated later in this specification.

EXAMPLE 2

16.2 g of p-acetoxybenzoic acid and 4.1 g of (+)-3-methyladipic acid were charged into the same reactor containing the polyethylene terephthalate oligomer as in Example 1 and polymerization was allowed to take place under the same conditions as in Example 1 to obtain a polymer in 75% yield. This polymer was found to have an inherent viscosity ηinh of 0.59 dl/g.

The polymer was formed into a film having a thickness of about 100 μm in the same way as in Example 1. This film exhibited a cholesteric color and a selective reflection was recognized at 750 nm. Mechanical properties of this film will be tabulated later in this specification.

COMPARATIVE EXAMPLE 1

5.4 g of the polyethylene terephthalate oligomer prepared in Example 1 and 0.6 g of (+)-3-methyladipic acid were charged into a reactor, and after purging with nitrogen, heating was made to 280° C. and reaction was allowed to take place for 3 hours in a nitrogen gas stream under stirring. Then, reaction was allowed to proceed for 1 hour at the same temperature and under a reduced pressure of 0.5 mmHg to obtain a prepolymer (PET/MA). During the reaction, a large amount of (+)-3-methyladipic acid volatilized and adhered to the condenser portion.

3 g of the prepolymer (PET/MA) and 12 g of T2/60 [LPET/p-hydroxybenzoic acid (40/60 mole ratio) copolymer, a product of Eastman Kodak Co.] were charged into the reactor, and after purging with nitrogen, heating was made to 280° C. and reaction was allowed to take place for 3.5 hours in a nitrogen gas atmosphere under stirring, followed by further reaction for 1.5 hours at the same temperature under a reduced pressure of 0.5 mmHg to obtain a polymer having an inherent viscosity ηinh of 0.77 dl/g.

The structure of this polymer was observed in terms of $^{13}$C-NMR; as a result, it was found that the amount of (+)-3-methyladipic acid introduced in the polymer chain was not larger than one third of the amount fed.

The polymer was pressed into a film having a thickness of about 100 μm in the same manner as in Example 1. In this film there was not recognized an optical selective reflection peculiar to a cholesteric liquid crystal at least at a wavelength not larger than 1,500 nm. Mechanical properties of the film, which will be tabulated later in this specification, were highly anisotropy and the same as the characteristics of a nematic liquid crystal.

COMPARATIVE EXAMPLE 2

10 g of the PET/p-hydroxybenzoic acid copolymer (T2/60) used in Comparative Example 1 and 2 g of (+)-3-methyladipic acid dimethyl ester were charged into the reactor, and after purging with nitrogen, heating was made to 280° C. and reaction was allowed to take place for 4 hours in a nitrogen gas stream under stirring. Then, the pressure was reduced at the same temperature; as a result, a large amount of distillate was observed. The pressure was reduced finally to 0.5 mmHg and reaction was allowed to take place for 1.5 hours. The resultant polymer was found to have an inherent viscosity ηinh of 0.82. As a result of examination in terms of $^{13}$C-NMR, it was found that there had been no introduction of 3-methyladipic acid in the polymer chain.

COMPARATIVE EXAMPLE 3

5.8 g of dimethyl terephthalate, 5.0 g of ethylene glycol, 1.9 g of (+)-3-methyladipic acid dimethyl ester, 10.6 g of methyl p-hydroxybenzoate, 5.5 mg of zinc acetate and 15 mg of antimony acetate were charged into a reactor equipped with a stirrer, and after purging with nitrogen, the temperature was held at 190° C. and reaction was allowed to take place in a nitrogen gas stream for 3 hours, followed by further reaction at 210° C. in a nitrogen gas stream for 3 hours. Thereafter, the temperature was raised to 270° C. and reaction was allowed to proceed for 0.5 hour in a nitrogen gas stream, then for 1.5 hours at a reduced pressure to obtain a polymer in 75% yield. This polymer was transparent and did not form a liquid crystal. Its inherent viscosity ηinh was as low as 0.11 dl/g.

COMPARATIVE EXAMPLE 4

Polymerization was conducted under the same conditions as in Example 1 except that a racemic mixture was used in place of (+)-3-methyladipic acid. As a result, a polymer having an inherent viscosity ηinh of 0.49 dl/g was obtained in 77% yield.

A film formed from this polymer exhibited a liquid crystallinity, but an optical selective reflection peculiar to a cholesteric liquid crystal was not observed. It was measured for mechanical properties and there were obtained such results as shown in Table below.

TABLE

| | | Measurement results of film mechanical properties | | | | | | |
|---|---|---|---|---|---|---|---|---|
| | | Wavelength of maximum reflecting in CD spectrum | *1 T∥ | *1 T⊥ | T∥/T⊥ | *1 M∥ | *1 M⊥ | M∥/M⊥ |
| | Mesophase | nm | MPa | | ratio | GPa | | Ratio |
| Example 1 | Cholesteric | 1300~1500 | 45 | 31 | 1.5 | 3.3 | 2.2 | 1.5 |
| Example 2 | Cholesteric | 750 | 45 | 30 | 1.5 | 3.5 | 2.8 | 1.3 |
| Comparative Example 1 | Nematic | Non | 97 | 22 | 4.4 | 3.1 | 1.1 | 2.8 |
| Comparative Example 2 | Nematic | Non | 51 | 17 | 3.0 | 3.5 | 1.0 | 3.5 |

*1 T represents a tensile strength and M represents a tensile modulus.
The subscript ∥ represents a direction parallel to the flow direction and the subscript ⊥ represents a direction perpendicular to the flow direction.

From the above Examples it is seen that even when molded at shear stress the cholesteric liquid crystal copolyesters of the present invention are less anisotropy of their mechanical properties and maintain high strength and high modulus.

What is claimed is:

1. A process for preparing a cholesteric liquid crystal copolyester consisting essentially of structural units represented by the following formula (A), (B), (C) and (D):

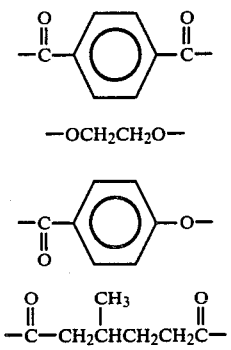

(A)

—OCH₂CH₂O— (B)

(C)

(D)

which is optically active characterized in that a polyethylene terephthalate oligomer having a (B)/(A) mole ratio in the range of 1.1 to 1.8, p-acetoxybenzoic acid and 3-methyladipic acid are reacted to prepare the final cholesteric liquid crystal copolyester having an inherent viscosity of at least 0.4 dl/g.

2. A process as set forth in claim 1, wherein the (B)/(A) mole ratio of the polyethylene terephthalate oligomer is in the range of 1.2 to 1.5.

3. A process as set forth in claim 1, wherein said copolyester comprises 20–80 mole% of structural unit (C), 1–20 mole% of structural unit (D), and the balance of structural units (A) and (B).

4. A process as set forth in claim 1, wherein said copolyester comprises 30–70 mole% of structural unit (C), 2–15 mole% of structural unit (D), and the balance of structural units (A) and (B).

5. A process as set forth in claim 1, wherein the reaction is carried out in a molten condition at a temperature in the range of 200° to 350° C.

* * * * *